United States Patent
Sekine et al.

(10) Patent No.: US 8,473,547 B2
(45) Date of Patent: Jun. 25, 2013

(54) METHODS AND STRUCTURE FOR UTILIZING DYNAMIC CAPABILITIES IN CLIENT/SERVER SOFTWARE INTERACTION

(75) Inventors: Hitoshi Sekine, Los Altos, CA (US); Yue Liu, Milpitas, CA (US); Bin Li, Sunnyvale, CA (US)

(73) Assignee: Ricoh Company, Ltd, Tokyo (JP)

( * ) Notice: Subject to any disclaimer, the term of this patent is extended or adjusted under 35 U.S.C. 154(b) by 279 days.

(21) Appl. No.: 12/874,390

(22) Filed: Sep. 2, 2010

(65) Prior Publication Data

US 2012/0060157 A1   Mar. 8, 2012

(51) Int. Cl.
| | |
|---|---|
| G06F 15/16 | (2006.01) |
| G06F 15/173 | (2006.01) |
| G06F 3/12 | (2006.01) |
| G06F 9/46 | (2006.01) |
| G06F 3/00 | (2006.01) |
| G06F 9/44 | (2006.01) |
| G06F 13/00 | (2006.01) |

(52) U.S. Cl.
USPC ........... 709/203; 709/201; 709/202; 709/217; 709/219; 709/226; 709/229; 358/1.13; 358/1.15; 718/100; 719/313

(58) Field of Classification Search
USPC . 709/201–203, 229, 217, 219, 226; 358/1.13, 358/1.15
See application file for complete search history.

(56) References Cited

U.S. PATENT DOCUMENTS

| | | | |
|---|---|---|---|
| 2009/0033976 A1* | 2/2009 | Ding | 358/1.15 |
| 2009/0063710 A1 | 3/2009 | Sekine et al. | |
| 2009/0063718 A1 | 3/2009 | Sekine et al. | |
| 2009/0279125 A1* | 11/2009 | Liu et al. | 358/1.15 |
| 2010/0149579 A1* | 6/2010 | Shah et al. | 358/1.14 |
| 2011/0022641 A1* | 1/2011 | Werth et al. | 707/803 |

* cited by examiner

Primary Examiner — Andrew Lai
Assistant Examiner — Albert Shih
(74) Attorney, Agent, or Firm — Duft Bornsen & Fettig, LLP

(57) ABSTRACT

Methods and structure for improved client/server program communication by transmitting dynamically maintained service capabilities information from the server program to the client program. The client program generates a service request based on the received service capabilities information. Since the service capabilities information is retrieved from the server program and is dynamically maintained by the server program, the client program need not be updated when available services from the server program are modified. In one exemplary embodiment, the client program may be a print application client program and the server program may be a print server program. The print client program retrieves the current printer device capabilities (service capabilities information) and generates a print job ticket (service request) based on the retrieved, dynamically maintained printer device capability information. The job ticket is then transmitted to the server program to cause the printing of the document specified by the job ticket.

20 Claims, 7 Drawing Sheets

METHODS AND STRUCTURE FOR UTILIZING DYNAMIC CAPABILITIES IN CLIENT/SERVER SOFTWARE INTERACTION

RELATED PATENT APPLICATIONS

This patent is related to commonly owned, co-pending, U.S. patent application Ser. No. 11/846,884, entitled CAPABILITY-BASED CONTROL OF A COMPUTER PERIPHERAL DEVICE, filed 29 Aug. 2007 and is related to commonly owned, co-pending, U.S. patent application Ser. No. 11/846,926, entitled AUTOMATICALLY GENERATING CAPABILITY-BASED COMPUTER PERIPHERAL DEVICE DRIVERS, both of which are hereby incorporated by reference.

BACKGROUND

1. Field of the Invention

The invention relates generally to computer program communications using a client/server paradigm and more specifically relates to methods and structures for utilizing in a client program dynamically obtained service capabilities of a server.

2. Discussion of Related Art

In printing environments, it is common for a printing application to utilize services of a print server generate printed output for a print job. In such environments, the printing application may act in the role of a client program that requests services from a server program. The client and server programs may reside and operate in different computing devices coupled via a network or may reside and operate within a common computing device. In client/server computing paradigms, a client program generally requests a service from a server program and the two programs exchange information to effectuate the requested service.

For example, in printing environments, the client application program may generate a document to be printed and forward the document to be printed to a print server program requesting that the print server provide the services of formatting, layout, and rendering of the provided document generated by the client application program. The client application program may generate a so-called "job ticket" indicating various options and preferences for the print job to be processed by the print server. The job ticket is generally created by the client program interacting with a user or application program interface to select desired options from a set of available options and settings provided by the server program (i.e., "available services" provided by the server program). For example, a job ticket may be defined by the client application program to indicate which print data file is to be printed (e.g., the document to be printed) as well as indications of a desire to print the document in duplex (two sided) form, on letter size paper, utilizing full color imaging (as distinct from mere black-and-white printing), etc. These and other exemplary options may be selected by a user or by the client application program from a list of available options/services. The list of available options is typically encoded in a table or file often referred to as a "device capabilities" file (or simply "DevCap file"). The device capabilities file may be more generally referred to as a "service capabilities" file where the client/server interaction is more generally referring to any optional services provided by a particular server computing device.

In present client/server computation models, the client and server programs must be designed in a cooperative manner such that the client is aware of all service capabilities available from the server program. If the server program is modified to change, add, or subtract a particular service, the cooperating client program must be similarly modified to enable a user of the client program to alter its utilization of a changed service, to utilize the newly added service, or to cease utilization of a removed service. Where the client and server programs are both provided by a software vendor, the vendor is burdened with updating and distributing the client program to a potentially large number of users. Where the client program is a customized application, the customized application designer/user may be burdened with modifying the client program to account for the changes in the server program. Regardless of where the client program maintenance burden falls, present client/server computation models require the redesign/modification of client programs to match the services provided by the corresponding server program. Such a requirement for periodic redesign or modification of the client program gives rise to numerous problems for re-testing and re-distributing a modified client program.

Thus, it is an ongoing challenge to reduce the burden and potential for errors in maintaining client programs to be compatible with services provided by corresponding server programs.

SUMMARY

The present invention solves the above and other problems, thereby advancing the state of the useful arts, by providing methods and associated structure for improved client/server program communication by transmitting dynamically maintained service capabilities information from the server program to the client program. The client program may then generate a service request based on the received service capabilities information. Since the service capabilities information is retrieved from the server program and is dynamically maintained by the server program, the client program need not be updated when available services from the server program are modified. In one exemplary embodiment, the client program may be a print application client program and the server program may be a print server program. The print client program retrieves the current printer device capabilities (service capabilities information) from the print server program. The print client program then generates a print job ticket (service request) based on the retrieved, dynamically maintained printer device capability information. The job ticket so generated is then transmitted to the server program to cause the printing of the document specified by the job ticket using the printer options/settings indicated in the print job ticket.

One aspect hereof provides a method for communicating available services between a client program and a server program. The method comprises receiving, within the client program, service capabilities information from the server program. The service capabilities information comprises information regarding available services from the server program. The method also comprises generating a service request within the client program based on the service capabilities information and transmitting the service request from the client program to the server program to request a desired service from the server program.

Another aspect hereof provides a method for communicating available services between a client program and a server program. The method comprises transmitting service capabilities information from the server program to the client program. The service capabilities information comprises information regarding available services from the server program. The method also comprises receiving in the server program a service request from the client program. The service request requesting performance of a service from the server program wherein the service request is based on the service capabilities information. The method also comprises performing the requested service within the server program responsive to receipt of the service request.

Still another aspect hereof provides a system comprising a client program operating on a client computing device and a server program operating on a server computing device. The server program is communicatively coupled with the client program. The system further comprises a memory coupled with the server program for storing service capabilities information. The service capabilities information comprises information regarding available services from the server program. The server program is adapted to transmit the service capabilities information to the client program and the client program is adapted to receive the service capabilities information from the server program. The client program is further adapted to generate a service request based on the service capabilities information and is further adapted to transmit the service request to the server program. The service request requests a desired service be performed by the server program on behalf of the client program. The server program is further adapted to receive the service request and is further adapted to perform the desired service.

BRIEF DESCRIPTION OF THE DRAWINGS

The same reference number represents the same element or same type of element on all drawings.

DETAILED DESCRIPTION OF THE DRAWINGS

FIGS. 1 through 8 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
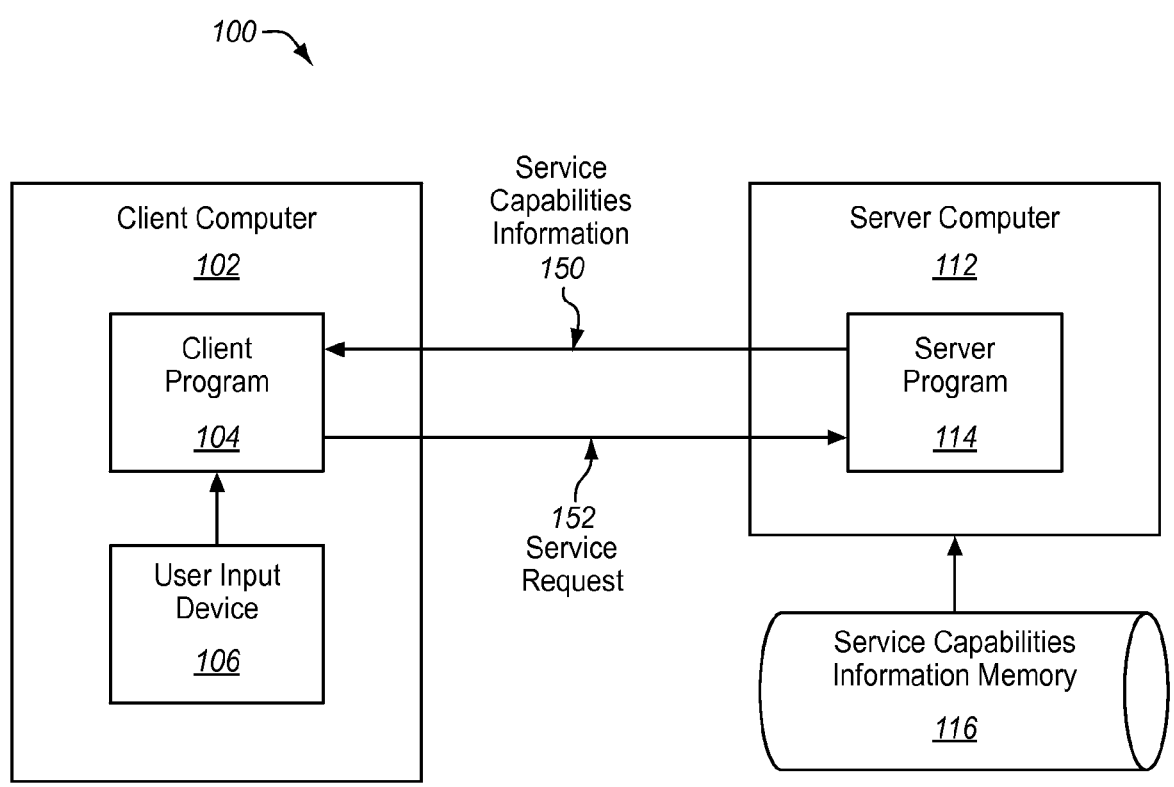
FIGS. 1 and 2 are block diagrams of an exemplary systems for enhanced client/server communication in accordance with features and aspects hereof.

FIG. 1 is a block diagram of an exemplary system 100 enhanced in accordance with features and aspects hereof to provide communication of dynamic service capabilities information between a client program 104 and a server program 114. Client program 104 may be any suitable application or system program operating on a client computer 102. Server program 114 may be any suitable software providing designated services operable on server computer 112. In one exemplary embodiment, client computer 102 and server computer 112 may be separate, distinct computing devices. In another exemplary embodiment, client computer 102 and server computer 112 may be implemented as a single computing device on which both client program 104 and server program 114 are operable. Client computer 102 and server computer 112 may each be any suitable computing device including, for example, personal computers, workstations, etc.

A memory 116 may be associated with server computer 112 and more specifically may be communicatively coupled with server program 114. Memory 116 is adapted to store service capabilities information regarding available services from server program 114 operable on server computer 112. Service capabilities information retrieved from memory 116 by server program 114 may be communicated to client program 104 as indicated by message 150. Any suitable communication mechanism may be utilized to couple client program 104 with server program 114 for purposes of transmitting message 150 or any other information. Where the client program 104 and server program 114 are operable on distinct computers (e.g., 102 and 112), a network communication media and protocol such as Ethernet and TCP/IP may be utilized for communications between client program 104 and server programming 14. In other exemplary embodiments, remote procedure calls or other suitable inter-process communication media and protocols may be utilized for exchange of messages between client program 104 and server program 114.

Responsive to receipt of service capabilities information as message 150, client program 104 generates a service request and transmits the service request to server program 114 as indicated by message 152. Responsive to receipt of service request message 152, server program 114 performs or executes the requested service on behalf of client program 104.

In one exemplary embodiment, client computer 102 may also include user input device 106 communicatively coupled with client program 104. User input device 106 may be any suitable device for receiving user input including, for example, a keyboard, a mouse (or other pointer device), a touch screen, voice recognition, etc. Having received service capabilities information as message 150, client program 104 may interact with a user through a user input device 106 to permit the user to select desired options or settings from the available services specified in the service capabilities information received as message 150.

Figure 2:
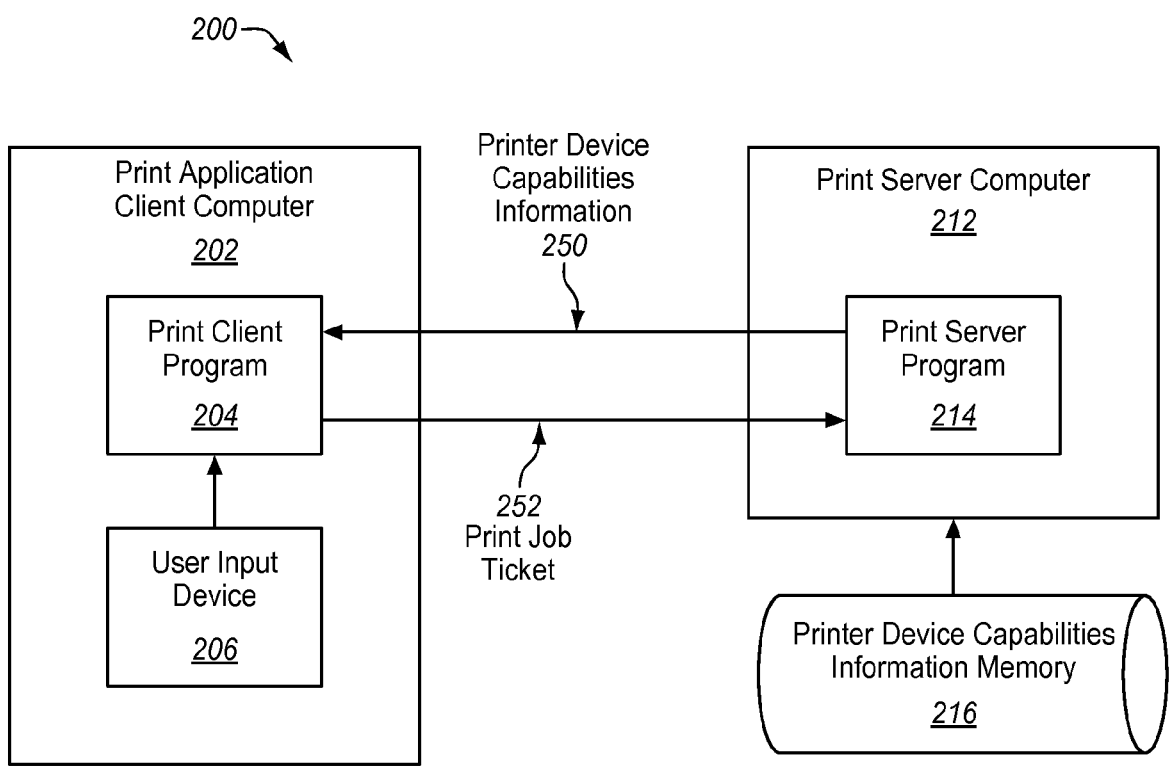

In one exemplary embodiment, features and aspects hereof may be utilized in client/server communications for a printing system enterprise. FIG. 2 depicts an exemplary system 200 in which a print client program 204 is operable within a print application client computer 202. Client program 202 is communicatively coupled with print server program 214 operable in a print server computer 212. Memory 216 is communicatively coupled with print server program 214 and is adapted to store information regarding available services provided by print server program 214. Printer device capabilities information may be retrieved from memory 216 and transmitted from print server program 214 to print client program 204 as message 250. Responsive to receipt of the printer device capabilities information, print client program 204 may generate a print job ticket (e.g., a service request) specifying a print job to be processed using identified services within print server program 214. Print server program 214 then executes or performs the requested services in accordance with the directions (settings and options) specified within the print job ticket received as message 252. User input device 206 may be utilized by print client program 204 to permit user selection of desired print options/settings based on the available services indicated in the received printer device capabilities information.

As above with respect to FIG. 1, print application client computer 202 and print server computer 212 may be distinct, separate computing devices. Alternatively, computer 202 and computer 212 may be a single computing device on which both print client program 204 and print server program 214 are operable.

Those of ordinary skill in the art will readily recognize numerous additional and equivalent elements in fully functional computers and the systems of FIGS. 1 and 2. Such additional and equivalent elements are omitted herein for simplicity and brevity of this discussion. Further, those of ordinary skill in the art will recognize that the service capabilities information (e.g., device capabilities) and service requests (e.g., job tickets) may be in accordance with any well known standards including, for example, JDF (specified by CIP4), PrintSchema (specified by Microsoft Corporation), XML, and PWG Semantics.

Figure 3:
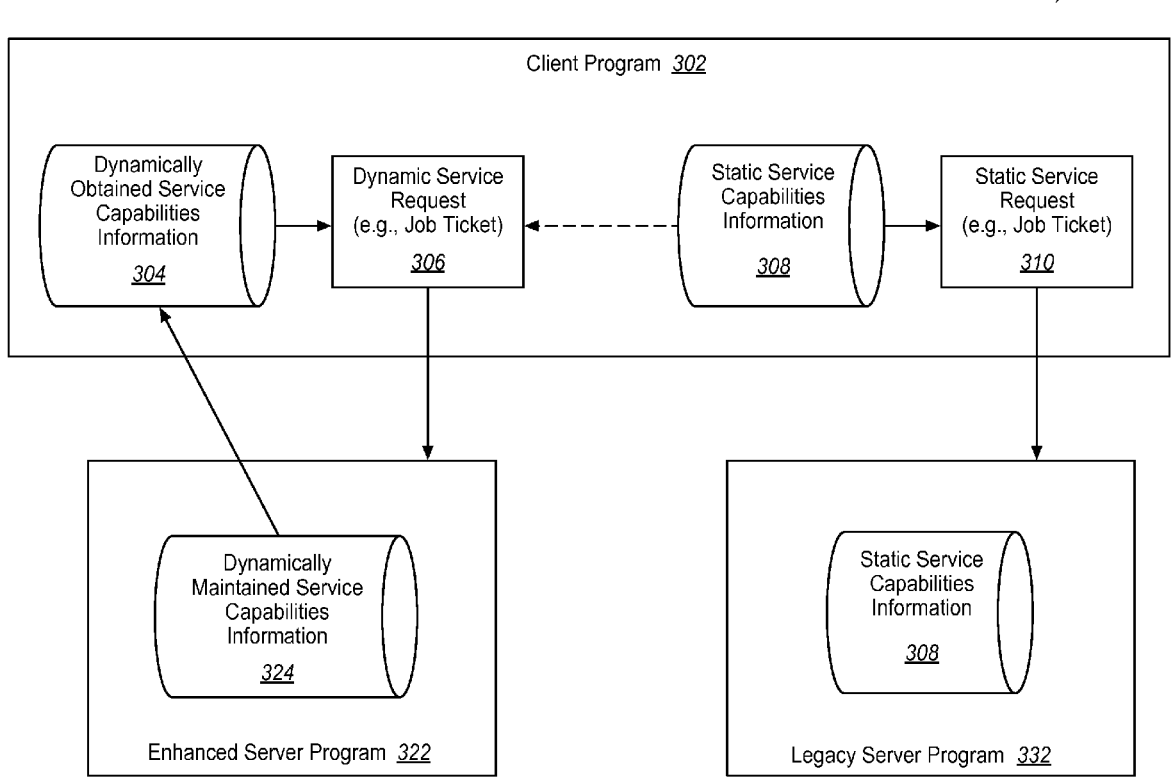
FIGS. 3 and 4 are block diagrams of exemplary additional details of the client and server programs of FIGS. 1 and 2 providing enhanced client/server program communication in accordance with features and aspects hereof.

FIG. 3 is a block diagram of a system 300 further describing operation of communicating client and server programs in accordance with features and aspects hereof. In particular, client program 302 of FIG. 3 may be adapted to interact with an enhanced server program 322 for utilizing dynamic service capabilities information as well as interacting with older legacy server program 332 using only static service capabilities information. In interacting with legacy server program 332, both the server program 332 and the client program 302 must utilize identical, static service capabilities information 308. As practiced in prior techniques, an installation process for system 300 assures that both the server program 332 and the client program 302 access identical static service capabilities information 308. In operation, as presently practiced in the art, client program 302 utilizes its copy of static service capabilities information 308 to generate a service request 310 (e.g., a job ticket generated from the static capabilities 308). The service request 310 so generated is then transmitted to the server program 332 to perform or execute the requested service.

In accordance with features and aspects hereof, client program 302 is also adapted to interact with enhanced server program 322 to utilize dynamic service capabilities information. More specifically, enhanced server program 322 includes a memory for storing dynamically maintained service capabilities information 324. The dynamically maintained service capabilities information 324 is transmitted to client program 302 as dynamically obtained service capabilities information 304. Client program 302 then utilizes information 304 to generate a service request 306 (e.g., job ticket) requesting services from enhanced server program 322. The service request 306 is generated based on the available services in the dynamically obtained service capabilities information 304. Thus, the service request 306 may specify services that are presently available from server program 322 as dynamically updated and maintained in memory 324. New services may be utilized in generating service request 306, removed services are not specified in information 304 and thus are precluded from being specified in service request 306 by operation of client program 302. Changes in settings or parameters associated with a service are current in the dynamic information 304 and thus may be utilized by client program 302 in generation of service request 306. Using this enhanced communication, as server program 322 is updated to modify service capabilities, client program 302 need not be modified but rather may be made aware of changes to the service capabilities by utilizing the dynamically obtained service capabilities information 304. In one exemplary embodiment, service request 306 may be generated by client program 302 based on features from either or both of the dynamic capabilities (304) and the static capabilities (308) already known to client 302. Such an implementation may allow client 302 to specify services merged from both static and dynamic service capabilities known to the client program 302.

Figure 4:
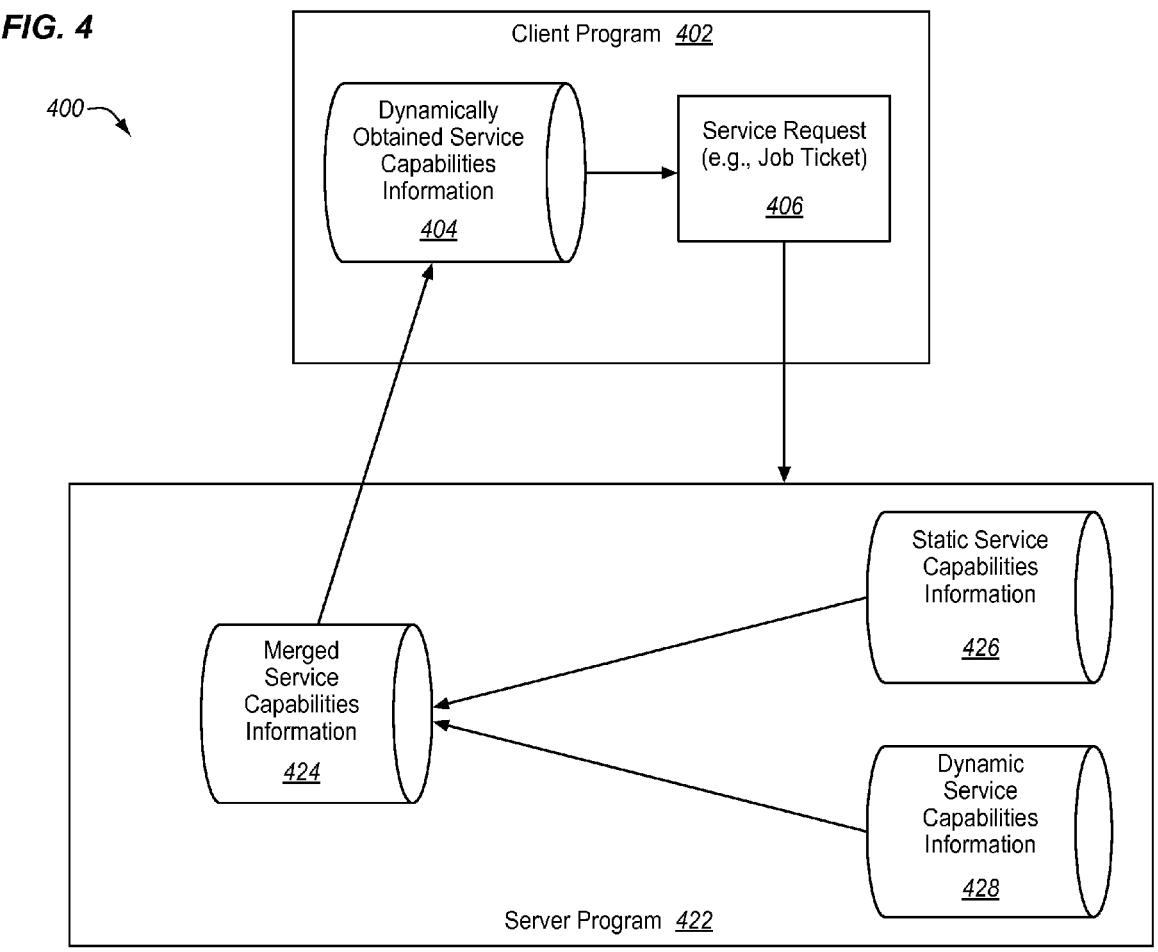

FIG. 4 is a block diagram providing exemplary additional details of the operations of an enhanced system 400 in accordance with features and aspects hereof Client 402 of FIG. 4 retrieves dynamically obtained service capabilities 404 from server program 422. Further, client program 402 generates service request 406 (e.g., job ticket) based on the available services specified in the dynamically obtained service capabilities information 404. Server program 422 may include both static service capabilities information 426 and dynamic service capabilities information 428. Server program 422 is then operable to merge the static information 426 and dynamic information 428 to generate merged service capabilities information 424. The merged service capabilities information 424 is then transmitted to client program 402 to be utilized as dynamically obtained service capabilities information 404.

Those of ordinary skill in the art will readily recognize numerous additional and equivalent elements in fully functional systems 300 and 400 of FIGS. 3 and 4, respectively. Such additional and equivalent elements are omitted herein for simplicity and brevity of this discussion.

Figure 5:
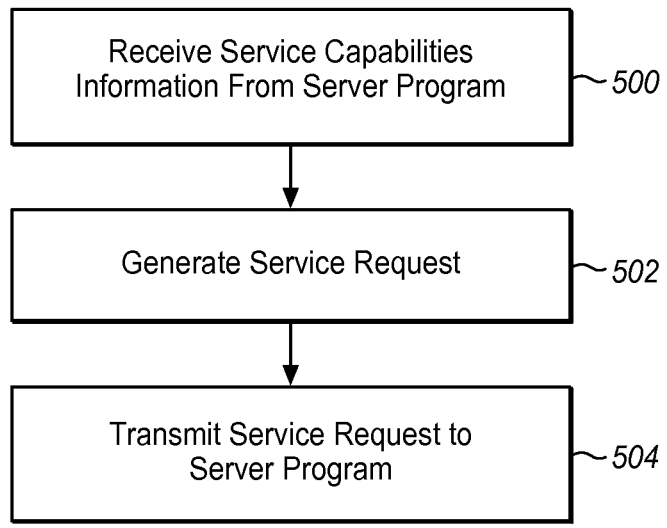
FIGS. 5 through 7 are flowcharts describing exemplary methods for enhanced client/server program communications in accordance with features and aspects hereof.

FIG. 5 is a flowchart describing an exemplary method in accordance with features and aspects hereof to enhance operation of a client program in a client/server communication system. The method of FIG. 5 may be operable on a client computer executing a client program such as the client programs 102, 202, 302, and 402 depicted in FIGS. 1, 2, 3, and 4, respectively. At step 500, the client program receives service capabilities information from the server program. The service capabilities information describes available services from the server program that may be utilized by client the client program. At step 502, the client program generates a service request based on the received service capabilities information. Services identified in the service capabilities information may be requested in the service request along with identification of any appropriate parameters and settings to be specified for such services (as also indicated by the service capabilities information). At step 504, the generated service request is transmitted to the server program to request execution or performance of the service or services identified in the generated service request.

Figure 6:
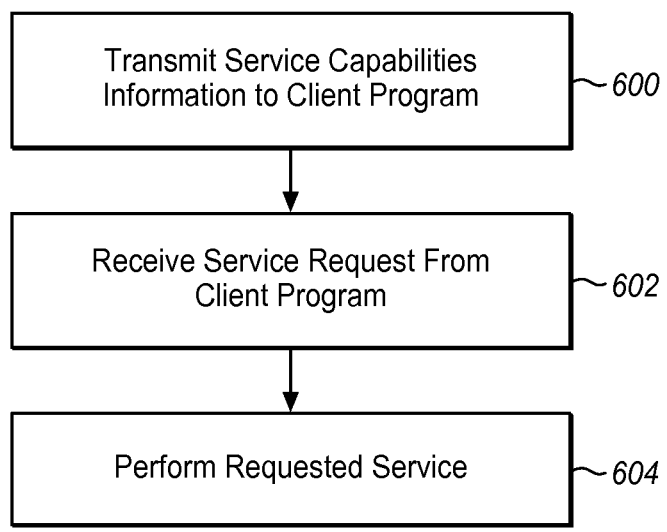

FIG. 6 is a flowchart describing an exemplary method in accordance with features and aspects hereof to enhance operation of a server program in a client/server communication system. The method of FIG. 6 may be operable on a server computer executing a server program such as server programs 112, 212, 322, and 422 of FIGS. 1, 2, 3, and 4, respectively. At step 600, the server program transmits service capabilities information to the requesting client program. The service capabilities information describes available services from the server program that may be utilized by a client program. At step 602, the server program receives a service request from the client program. The service request is generated by the client program based on the dynamically obtained service capabilities information previously transmitted from the server program to the client program. At step 604, the requested service or services are performed/executed by the server program for the benefit of the requesting client program.

In one exemplary embodiment, as noted above, the client program may be a printing application client program and the server program may be a print server program. The printing client program may therefore receive the service capabilities information as indicative of printer device capabilities for printers managed by the print server program. The capabilities described in the service capabilities information therefore provide settings and options for services available from the print server program. The service request may therefore comprise a print job ticket specifying selected settings and options for a document to be printed by the print server program at the request of the print client program. Responsive to receipt of the service request (e.g., job ticket), the print server program formats, lays out, and renders an identified document in accordance with the settings and options specified in the job ticket. The print job so formatted and rendered may then be printed under control of the print server program on behalf of the requesting print application client program.

Figure 7:
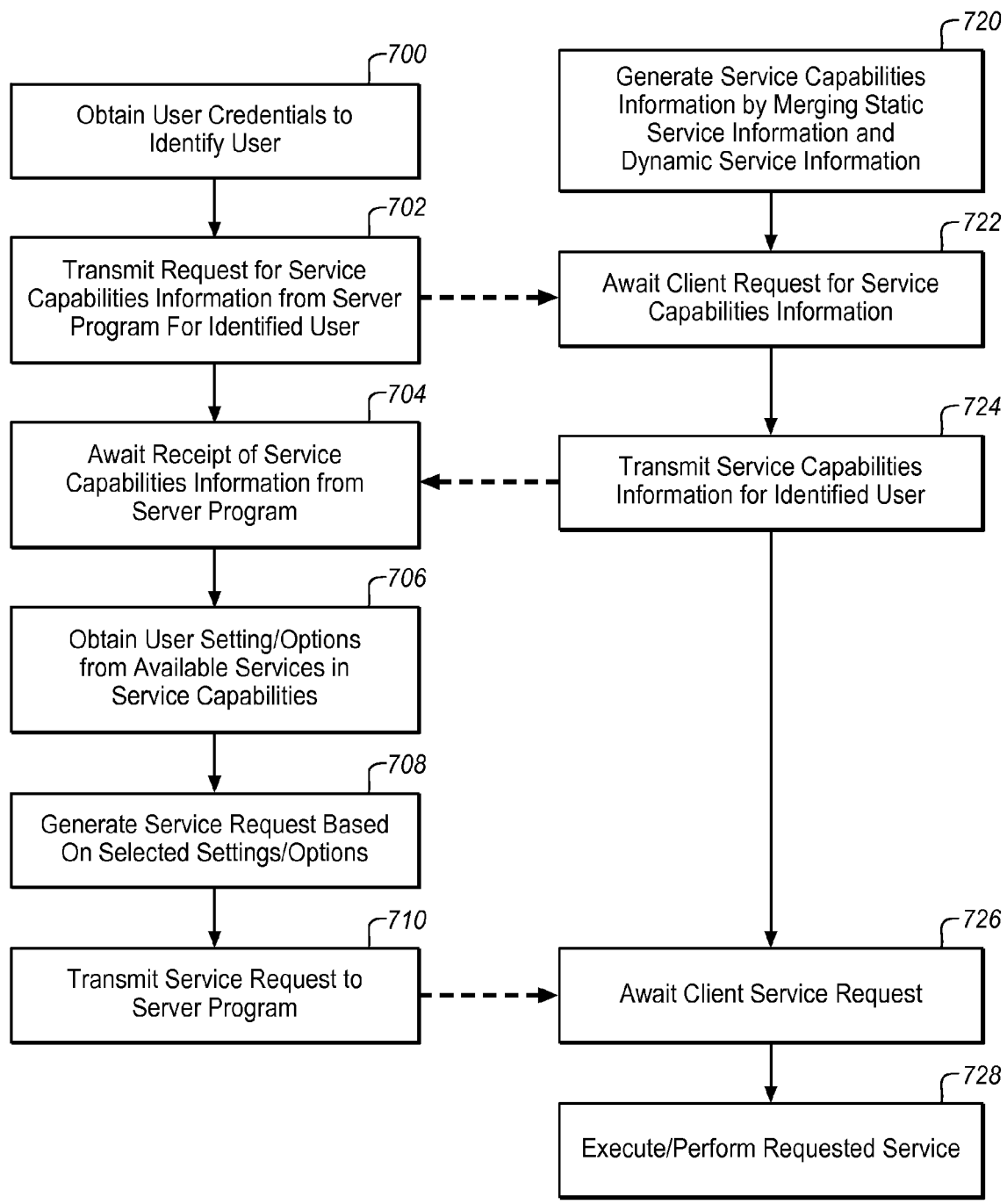

FIG. 7 is a flowchart describing an exemplary method in accordance with features and aspects hereof to provide client/server communications where the client program receives dynamically maintained service capabilities information from the server program. The method of FIG. 7 may be operable in system comprising a client program and a server program as described above with respect to FIGS. 1 through 4. In particular, steps 700 through 710 may be operable in the client program while steps 720 through 728 may be operable in a cooperative manner in the server program.

In one exemplary embodiment, the client program at step 700 obtains user credentials to identify the user of the client program The user credentials may comprise a user ID and/or password, a personal identification number (PIN), biometric information, or any other suitable information for identifying a user of the client program. In other embodiments, the user need not be identified for purposes of generating a service request. At some point during initialization of the server program, or at any time when service capabilities within the server program are modified, step 720 generates the current service capabilities information by merging any previously defined static service information ad modified by any currently defined dynamic service information. The service capabilities information so generated by the merger may be transmitted to a requesting client program to provide the client program with current available services from the server program. At step 722, the server program awaits a request from the client program to retrieve the service capabilities information generated at step 720. Returning to the client program operation, at step 702, responsive to the client program requiring services from the server program, the client program generates a request for retrieval of the current service capabilities information from the server program. As noted above, in some embodiments, user credentials may be obtained (at step 700) to identify the particular user of the client program. In such embodiments, the request for service capabilities information from the server program may include the identified user information (e.g., the supplied user credentials or other information identifying a user of the client program). At step 704, the client program then awaits receipt of the requested service capabilities information from the server program.

Returning to operation of the server, responsive to receipt of the request for service capabilities information (optionally specifying an identified user), step 724 transmits the requested service capabilities information (for the identified user) back to the requesting client program. At step 726, the server program awaits receipt of a service request from the client program.

Returning to the client program operation, responsive to receipt of the requested service capabilities information from the server program, step 706 obtains user input selecting particular settings or options from the available services in the received service capabilities information. User input may be obtained utilizing any standard textual or graphical user interface as is well known in the art. The user interface presented to the identified user will indicate only the available services currently available from the server program as indicated in the retrieved, dynamically maintained, service capabilities information. Following selection of particular settings or options by the user, step 708 generates a service request based on the selected settings or options. The service request indicates the particular service or services requested by the user of the client program and any appropriate settings or options associated with those services. At step 710, the client program transmits the generated service request to the server program.

Returning to the server operation, responsive to receipt of the service request from the client program, the server program at step 728 executes or performs the requested service.

As noted above, in one exemplary embodiment, the client program may be a printer application client program and the server program may be of printer server print server program. The printing application client program may therefore request printer device capabilities (e.g., service capabilities information) from the print server program. Responsive to receipt of the dynamically maintained service capabilities information, the print application client program may generate a job ticket (a service request) based on the currently available services from the print server program. For example, the print application client program may request that the print server program print a document with particular desired settings and options based on the currently available services from the print server program. The settings and options may specify the formatting and layout to be performed on the identified document and may request that the print server render the document according to the specified settings and options.

Those of ordinary skill in the art will readily recognize numerous additional and equivalent steps in fully functional methods as described in FIGS. 5 through 7. Such additional and equivalent steps are omitted herein for simplicity and brevity of this discussion.

Figure 8:
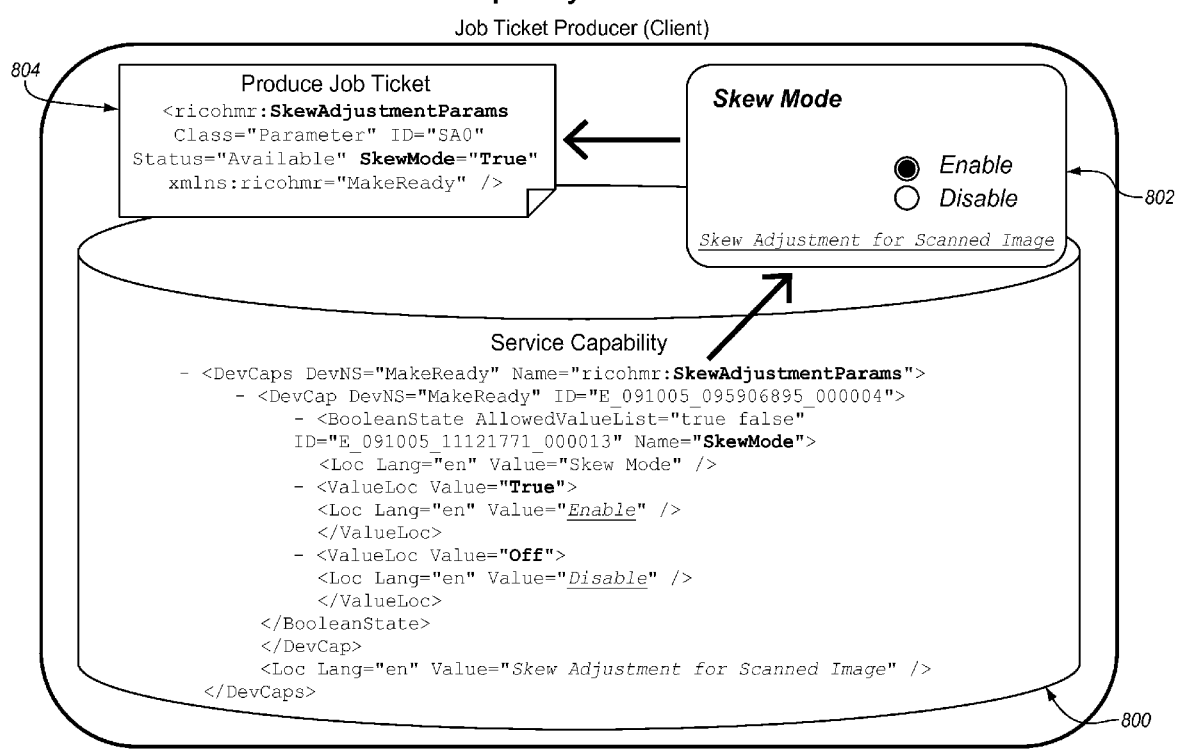
FIG. 8 is a diagram suggesting an exemplary customized service capability that may be specified in exemplary service capabilities information in accordance with features and aspects hereof.

FIG. 8 is a diagram describing an exemplary customized service capability that may be specified in exemplary service capabilities information. An exemplary service 800 (i.e., a service capability) may be specified as shown in accordance with CIP4 standards. In response to receipt of this service capability, he client program may present a graphical (or textual) user interface to permit the user to select (enable) or de-select (disable) the service so specified. Based on the user's selection 802 (e.g., to enable the "Skew Mode" service), a job ticket 804 is generated to specify the user's selection for this newly added service.

Although specific embodiments were described herein, the scope of the invention is not limited to those specific embodiments. The scope of the invention is defined by the following claims and any equivalents thereof.

We claim:

1. A method for communicating available printing services between a client and a server, the method comprising:
   receiving, within the client, print capabilities from the server that indicate operations that can be performed upon print data directly by the server, wherein the print capabilities are merged by the server from static print capabilities and dynamic print capabilities;

generating a job ticket within the client that requests print capabilities for processing a print job based on the print capabilities received from the server; and transmitting the job ticket from the client to the server to indicate the requested print capabilities to the server.

2. The method of claim 1
wherein the print capabilities received from the server include at least one capability selected from the group comprising: rendering print data, formatting print data, and adjusting a layout of print data.

3. The method of claim 1
wherein the step of generating further comprises:
selecting, by operation of the client, print job settings from the print capabilities that can be performed by the server; and
generating the job ticket based on the selected print job settings.

4. The method of claim 1 wherein the step of receiving further comprises:
determining within the client whether previously received print capabilities are valid; and
receiving the print capabilities from the server responsive to a determination that the previously received print capabilities are not valid.

5. The method of claim 4
wherein the step of determining further comprises:
querying the server from the client to determine a current version identifier for the print capabilities of the server;
comparing the current version identifier with a previous version identifier associated with the previously received print capabilities;
determining that the previously received print capabilities are valid if the current version identifier matches the previous version identifier; and
determining that the previously received print capabilities are not valid if the current version identifier does not match the previous version identifier.

6. The method of claim 1 further comprising:
receiving in the client user credentials from a user of the client; and
transmitting the user credentials to the server,
wherein the print capabilities received from the server are based on the transmitted user credentials.

7. The method of claim 1 further comprising:
transmitting a capability request from the client to the server requesting return of the print capabilities from the server to the client.

8. A method for communicating available printing services between a client and a server, the method comprising:
merging, at a server, static print capabilities and dynamic print capabilities to generate print capabilities to be transmitted to a client, the print capabilities indicating operations that can be performed upon print data directly by the server;
transmitting the print capabilities from the server to the client;
receiving in the server a job ticket from the client that requests performance of print capabilities from the server wherein the job ticket is based on the print capabilities received from the server; and
performing the requested print capabilities within the server responsive to receipt of the job ticket.

9. The method of claim 8
wherein the print capabilities transmitted from the server include at least one capability selected from the group comprising: rendering the data, formatting the print data, and adjusting a layout of the print data.

10. The method of claim 8 further comprising:
receiving in the server a capability request from the client, the capability request requesting print capabilities,
wherein the step of transmitting is responsive to receipt of the capability request.

11. The method of claim 8 wherein
the static print capabilities indicate available services from the server, and the dynamic print capabilities modify the static print capabilities.

12. The method of claim 8 further comprising:
receiving in the server a capability version request from the client, the capability version request requesting return of a current version identifier associated with the print capabilities of the server.

13. The method of claim 8 further comprising:
receiving in the server user credentials from the client wherein the user credentials identify a user of the client,
wherein the step of transmitting print capabilities further comprises transmitting print capabilities based on the received user credentials.

14. A system comprising:
a client operating on a client device;
a server operating on a server device, the server communicatively coupled with the client, wherein the server is adapted to merge static print capabilities and dynamic print capabilities to generate print capabilities to be transmitted to the client, the print capabilities indicating operations that can be performed upon print data directly by the server; and
a memory coupled with the server for storing the print capabilities;
wherein the server is adapted to transmit the print capabilities to the client and wherein the client is adapted to receive the print capabilities from the server,
wherein the client is further adapted to generate a job ticket based on the print capabilities and is further adapted to transmit the job ticket to the server wherein the job ticket requests a desired print capability be performed directly by the server on behalf of the client, and
wherein the server is further adapted to receive the job ticket and is further adapted to perform the desired print capability.

15. The system of claim 14
wherein the server comprises a print server, and
wherein the client comprises a print application.

16. The system of claim 15
wherein the job ticket comprises information requesting the print server to render an identified document.

17. The system of claim 16
wherein the job ticket comprises print settings based on the print capabilities.

18. The system of claim 17 further comprising:
a user input device coupled with the client device,
wherein the client receives user input through the user input device to select print settings indicated in the print capabilities.

19. The system of claim 14 wherein
the static print capabilities indicate available services from the server, and
the dynamic print capabilities modify the static print capabilities.

20. The system of claim 19
wherein the dynamic print capabilities further comprise:
information that indicates a modification of an available service in the static print capabilities;

information that indicates an available service in the static print capabilities is to be removed; and information that indicates a new service to be added to the available services in the static print capabilities.

* * * * *